US009334856B2

(12) United States Patent
Bae

(10) Patent No.: US 9,334,856 B2
(45) Date of Patent: May 10, 2016

(54) SYSTEM AND METHOD OF PHOTOIONIZATION OF FULLERENE AND DERIVATIVE CLUSTERS FOR HIGH THRUST-DENSITY ION THRUSTERS

(76) Inventor: Young Kun Bae, Perris, CA (US)

( * ) Notice: Subject to any disclaimer, the term of this patent is extended or adjusted under 35 U.S.C. 154(b) by 1024 days.

(21) Appl. No.: 13/288,689

(22) Filed: Nov. 3, 2011

(65) Prior Publication Data

US 2012/0110977 A1 May 10, 2012

Related U.S. Application Data

(60) Provisional application No. 61/409,963, filed on Nov. 4, 2010.

(51) Int. Cl.
*F03H 1/00* (2006.01)
*B64G 1/40* (2006.01)
*H01J 27/24* (2006.01)

(52) U.S. Cl.
CPC ................ *F03H 1/0037* (2013.01); *F03H 1/00* (2013.01); *F03H 1/0012* (2013.01); *F03H 1/0043* (2013.01); *H01J 27/24* (2013.01)

(58) Field of Classification Search
CPC ......... B64G 1/405; F03H 1/00; F03H 1/0012; F03H 1/0037; F03H 1/0043; F03H 1/005; F03H 1/0056; F03H 1/0062; F03H 1/0068; F03H 1/0075; F03H 1/0081; H01J 27/24
See application file for complete search history.

(56) References Cited

U.S. PATENT DOCUMENTS 3,500,450 A * 3/1970 Payton et al. ................. 250/573
3,659,943 A * 5/1972 Goolsby ......................... 356/70
5,239,820 A * 8/1993 Leifer ...................... B01D 7/00
60/202

OTHER PUBLICATIONS

Elsellem, "Electrode-less Plasma Thruster Design and Performances", 2004, Elwing LLC, 4th International Spacecraft Propulsion Conferernce, pp. 5-6, http://www.elwing.biz/files/ISPC04-slides.pdf.*

Schonherr, "Study of Evaporation of C60 and C70 in vacuum and inert gases", 2000, Electrochemical Society Proceedings, vol. 2000-12, pp. 89-90.*

(Continued)

*Primary Examiner* — Phutthiwat Wongwian
*Assistant Examiner* — William Breazeal
(74) *Attorney, Agent, or Firm* — Robert D. Eisler

(57) ABSTRACT

The present invention is for a system and a method of VUV photoionization of fullerene and derivative clusters followed by their thermal effusion for a practical energy-efficient and economically-viable high thrust density ion thruster. By taking advantage of the state-of-the-art high intensity VUV photon sources, present invention is able to provide much softer ionization with minimal internal energy deposition than the ionization in the electron impact or charge exchange type ionization in plasma environment used in conventional ion thrusters. Because the invention eliminates the need of additional gas for forming discharge plasma, it permits simpler and lighter structures than the conventional fullerene thrusters with significantly enhanced propellant-usage efficiencies, thrust to power ratios, and thrust to weight ratios. Because the present invention employs softer VUV photoionization, it permits the usage of heavier and more complex fullerene derivatives, nanotubes, and nanotube derivatives than fullerene clusters for fuels without significantly fragmenting them.

4 Claims, 4 Drawing Sheets

Cross Sectional View of Ion Thruster System

(56) References Cited

OTHER PUBLICATIONS

Hruby, "A High Thrust Density, C60 Cluster, Ion Thruster", 1993, Air Force Office of Scientific Research, p. 9, 11, 12, 20, http://www.dtic.mil/cgi-bin/GetTRDoc?AD=ADA264405.*
Kubodera, "Discharge pumped VUV rare-gas excimer laser", Lasers and Electro-Optics Society, 2002. LEOS 2002. The 15th Annual Meeting of the IEEE.*
Anderson et al. , "Fullerene Propellant Research for Electric Propulsion," AIAA 96/3211, 32nd AIAA/ASME/SAE/ASEE Joint Propulsion Conference and Exhibit, Lake Buena Vista, FL, 1996.
Leifer, S. D. , "Characterization of Fullerenes for Electrostatic Propulsion Applications," Ph.D. Dissertation, California Institute of Technology, 1995.
Leifer et al., "Thermal Decomposition of a Fullerene Mix," Physical Review B 51, 9973-9978, 1995.
Leifer et al., "Developments in Fullerene Ion Propulsion Research," AIAA/SAE/ASEE 30"h Joint Propulsion Conference, Indianapolis, IN, 1994.
Leifer, et al., "Effect of the Thermal Stability and Reactivity of Fullerenes on Ion Engine Propellant Applications," 25th AIAA Plasmadynamics and Lasers Conference, Colorado Springs, Co., 1994.
Anderson, et al., "Design and Testing of a Fullerene RF Ion Engine," AIAA-95/2664, 31st Joint Propulsion Conference, San Diego, Jul. 1995.
Anderson et al., "Fullerene Propellant Research for Electric Propulsion," AIAA 96-3211, 32nd Joint Propulsion Conference, Lake Buena Vista, Jul. 1996.
Takegahara et al., "C60 Molecule as a Propellant for Electric Propulsion," IEPC-93-032, 23rd International Electric Propulsion Conference, Sep. 1993.
Nakayama et al., "Fundamental Experiments of C60 Application to Ion Thruster," IEPC-95-88, 24th International Electric Propulsion Conference, Sep. 1995.
Takegahara et al., "C60 Feasibility Study on Application to Ion Thruster Preliminary Experiments Using Electron Bombardment Thruster," AIAA 95/2665, 31st Joint Propulsion Conference, San Diego, Jul. 1995.
Nakayama et al. "Study on C60 Application to Ion Thruster -Evaluation of Ion Production," 32nd Joint Propulsion Conference, Lake Buena Vista Jul. 1996.
Torres, "Prediction of the Performance of an Ion Thruster Using Buckminsterfullerene as the Propellant," Master of Science Thesis, MIT, Feb. 1993.
Hruby, et al., "A High Thrust Density, C60 Cluster, Ioon Thruster," AIAA 94/2466, 25th Plasmadynamics and Lasers Conference, Colorado Springs, Jun. 1994.
Hruby, et al., "Fullerene Fueled Electrostatic Thrusters—Feasibility and Initial Experiments," AIAA 94/3240, 30th Joint Propulsion Conference, Indianapolis, Jun. 1994.
Hruby, et al., "A High Thrust Density, C60 Cluster Ion, Thruster," AFOSR Final Report No. 49620-94-C-0006, Sep. 1996.

* cited by examiner

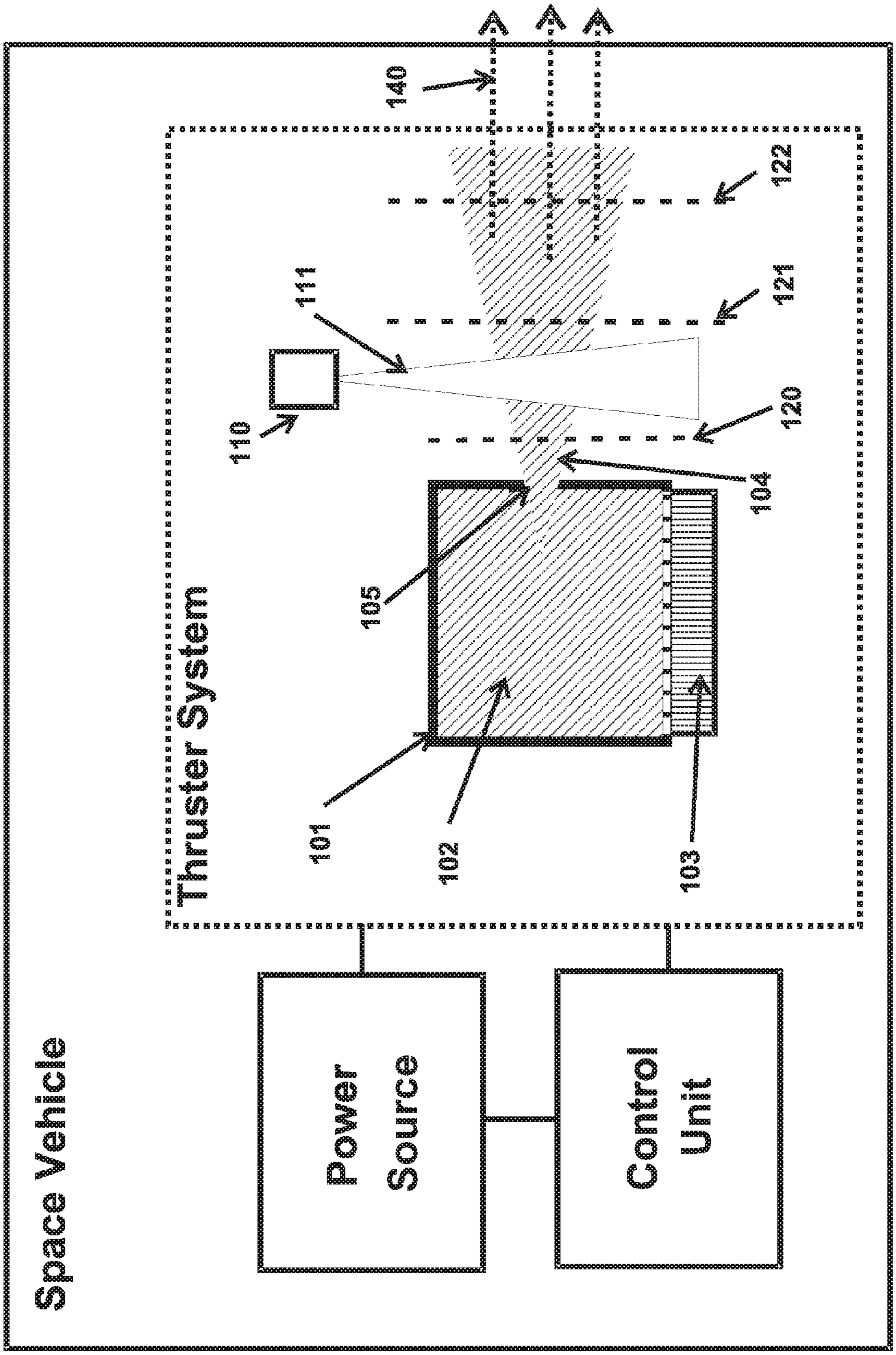
FIGURE 1. Cross Sectional View of Ion Thruster System

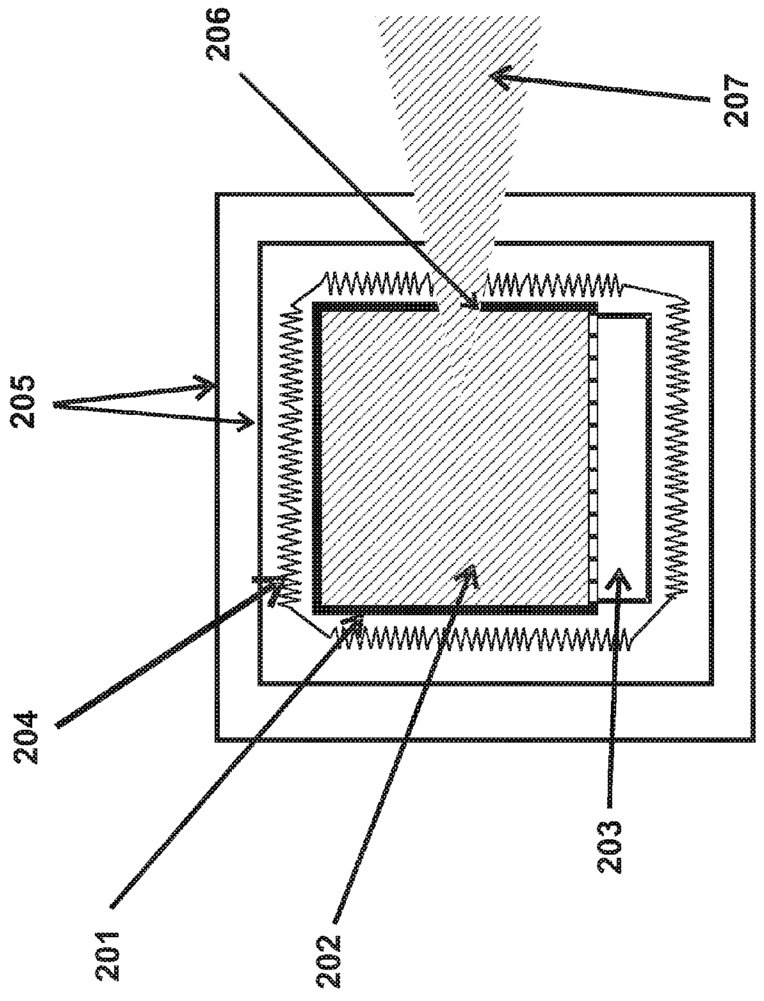
FIGURE 2. Detailed Cross Sectional View of Reference Details 101 through 105 in Figure 1

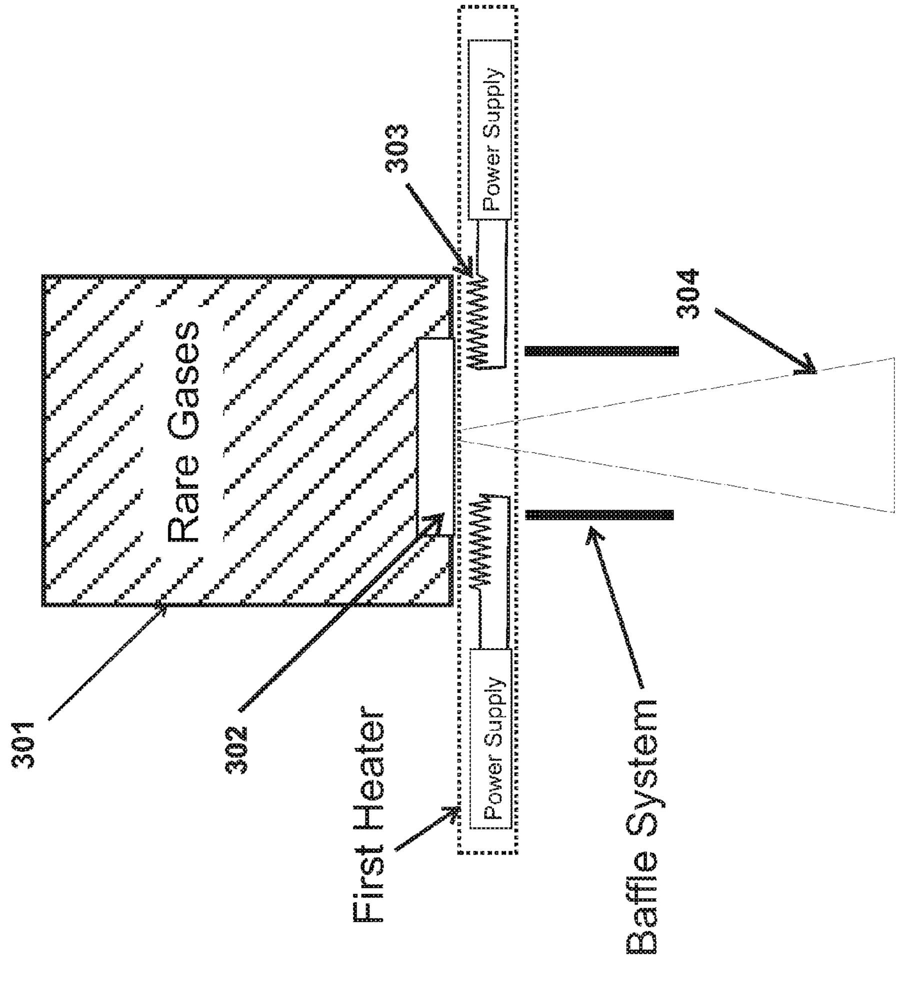
FIGURE 3. Detailed Cross Sectional View of Reference Details 110 through 111 in Figure 1

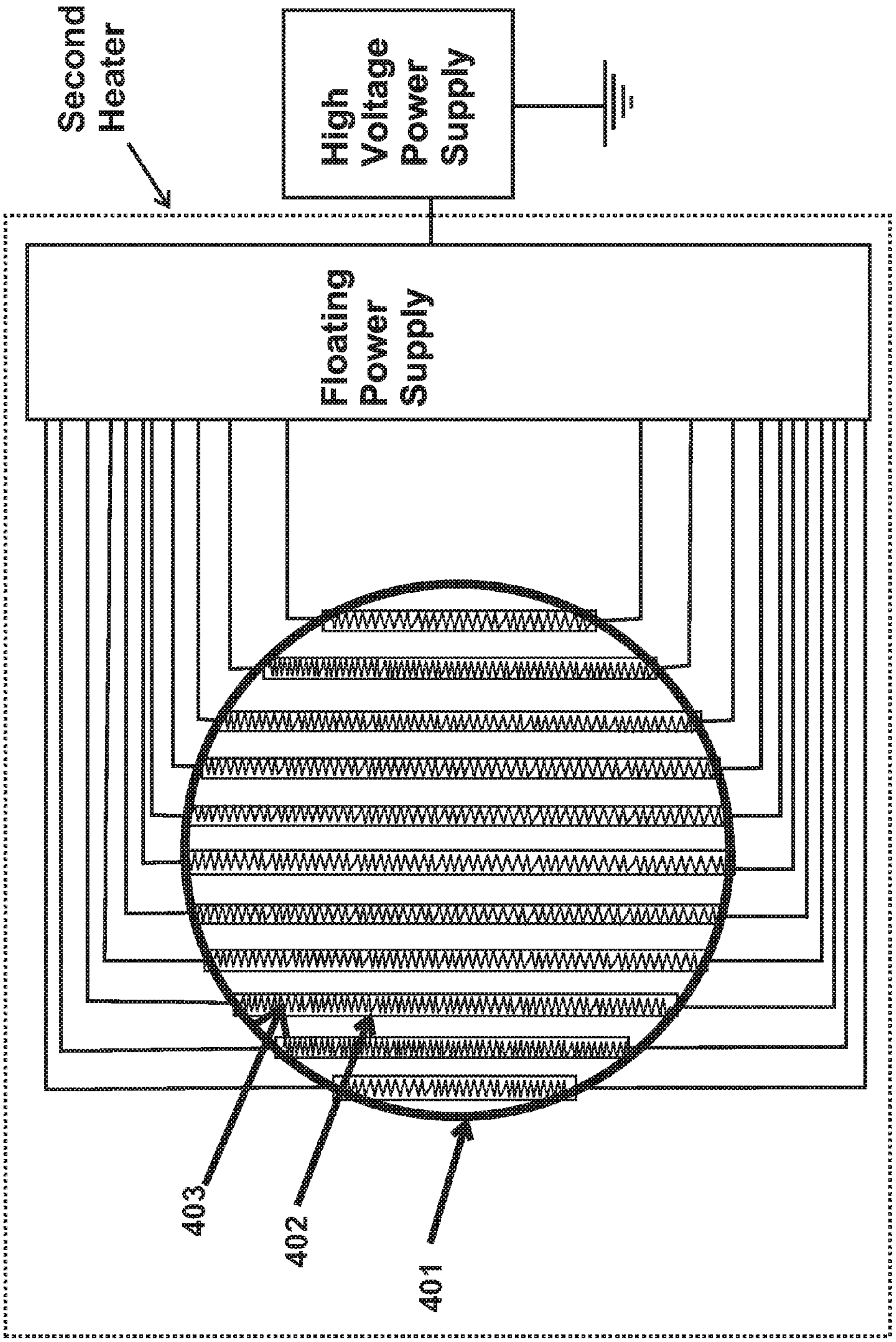
FIGURE 4. Plan View of One Typical Reference Detail 120, 121, or 122 in Figure 1

SYSTEM AND METHOD OF PHOTOIONIZATION OF FULLERENE AND DERIVATIVE CLUSTERS FOR HIGH THRUST-DENSITY ION THRUSTERS

PRIORITY NOTICE

The present application claims priority, under 35 USC §199(e) and under 35 USC §120, to the U.S. Provisional Patent with Application Ser. No. 61/409,963 filed on Nov. 4, 2010, the disclosure of which is incorporated herein by reference in its entirety.

GOVERNMENT INTEREST

This invention was made with Government support under Contract No. HDTRA1-10-C-0088 awarded by the Defense Threat Reduction Agency. The Government has certain rights in the invention.

COPYRIGHT & TRADEMARK NOTICE

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and shall not be construed as descriptive or to limit the scope of this invention to material associated only with such marks.

REFERENCES CITED

US Patent Documents

U.S. Pat. No. 5,239,820 August 1993 Leifer et al.

Other Publications

Anderson et al., "Fullerene Propellant Research for Electric Propulsion," AIAA 96-3211, 32nd AIAA/ASME/SAE/ASEE Joint Propulsion Conference and Exhibit, Lake Buena Vista, Fla., 1996.

Leifer, S. D., "Characterization of Fullerenes for Electrostatic Propulsion Applications," Ph.D. Dissertation, California Institute of Technology, 1995.

Leifer et al., "Thermal Decomposition of a Fullerene Mix," Physical Review B 51, 9973-9978, 1995.

Leifer et al., "Developments in Fullerene Ion Propulsion Research," AIAA/SAE/ASEE 30" h Joint Propulsion Conference, Indianapolis, Ind., 1994.

Leifer, et al., "Effect of the Thermal Stability and Reactivity of Fullerenes on Ion Engine Propellant Applications," 25th AIAA Plasmadynamics and Lasers Conference, Colorado Springs, Co., 1994.

Anderson, et al., "Design and Testing of a Fullerene RF Ion Engine," AIAA-95-2664, 31st Joint Propulsion Conference, San Diego, July 1995.

Anderson et al., "Fullerene Propellant Research for Electric Propulsion," AIAA 96-3211, 32nd Joint Propulsion Conference, Lake Buena Vista, July 1996.

Takegahara et al., "C60 Molecule as a Propellant for Electric Propulsion," IEPC-93-032, 23rd International Electric Propulsion Conference, September 1993.

Nakayama et al., "Fundamental Experiments of C60 Application to Ion Thruster," IEPC-95-88, 24th International Electric Propulsion Conference, September 1995.

Takegahara et al., "C60 Feasibility Study on Application to Ion Thruster Preliminary Experiments Using Electron Bombardment Thruster," AIAA 95-2665, 31$^{st}$ Joint Propulsion Conference, San Diego, July 1995.

Nakayama et al. "Study on C60 Application to Ion Thruster-Evaluation of Ion Production," 32nd Joint Propulsion Conference, Lake Buena Vista July 1996.

Tones, "Prediction of the Performance of an Ion Thruster Using Buckminsterfullerene as the Propellant," Master of Science Thesis, MIT, February 1993.

Hruby, et al., "A High Thrust Density, C60 Cluster, loon Thruster," AIAA 94-2466, 25th Plasmadynamics and Lasers Conference, Colorado Springs, June 1994.

Hruby, et al., "Fullerene Fueled Electrostatic Thrusters—Feasibility and Initial Experiments," AIAA 94-3240, 30th Joint Propulsion Conference, Indianapolis, June 1994.

Hruby, et al., "A High Thrust Density, $C_{60}$ Cluster Ion, Thruster," AFOSR Final Report No. 49620-94-C-0006, September 1996.

TECHNICAL FIELD OF THE INVENTION

The present invention relates in general to ion thrusters for space propulsion.

BACKGROUND OF THE INVENTION

Ion thrusters or engines have played vital role in space propulsion for wide ranges of applications, such as low thrust precision attitude control, orbit transfer and interplanetary flights. One of crucial parameters of ion thrusters, which determine its applicability to specific missions, is the thrust density, the ratio of the thrust to the area of the exit nozzle/electrode. The high thrust density correlates with a smaller accelerator grid area that is essential in minimizing the construction, operation and lifting costs of the ion thrusters. Although the power to thrust conversion efficiency and $I_{sp}$ of ion thrusters can be much higher than conventional chemical thrusters, the ion thrusters currently are not used for missions requiring large thrusts in the order of multi megawatts, because their construction and lifting costs are prohibitive. Therefore, the methods of increasing thrust density of ion thrusters can significantly broaden their application scopes have been extensively sought for.

The operation of the ion thruster relies on acceleration of ions. Thus, the space-charge limitation of the ion acceleration process limits the thrust density. Currently, most of ion thrusters use atomic species, such as Xe or Hg making the ion thruster practical for only a limited range of missions. Extensive research efforts have attempted to increase thrust density to levels that would lead to an attractive ion thruster with wider applicability with the use of heavier ion species than Xe or Hg without success. The method of increasing thruster density can be guided by a physical theory by Child-Langmuir law, and according to this law, the thrust density, $T_a$, of an ion thruster can be given by:

$$T_a \propto m_i^2 I_{sp}^4, \quad (1)$$

where $I_{sp}$ is the specific impulse and $m_i$ is the ion mass of the propellant. For a specific mission with a fixed $I_{sp}$, the higher the ion mass is, the higher is the thruster density. Because the thrust density is proportional to square of the ion mass, even small change in ion mass can increase the thrust density significantly. For example, the atomic mass of the most popular propellant Xe is 131, and any fuels with atomic or molecular mass greater than 131 would increase the thrust density over the current limit.

Molecular or cluster ions can potentially increase ion mass significantly, however, with highly increased probability of fragmentation, which negates the effect of increased ion mass on thrust density. Therefore, the usage of molecular or cluster ions for ion thrusters has not been successful until now. Fullerene clusters, such as $C_{60}$, have much larger masses than Xe, yet under favorable thermodynamic conditions, they behave like atoms in terms of resisting fragmentation. In addition to their larger mass than that atomic species, fullerene clusters have lower ionization potentials, thus require lesser energy for ionization than atomic species. Fullerene clusters can be sublimated at relatively low temperatures without fragmentation, and their vapors behave like atomic vapors. Therefore, the usage of $C_{60}$ for propellant for ion thrusters has been extensively investigated by researchers over two decades.

For example, $C_{60}$ clusters, cardinal clusters among fullerenes, have a mass of 720. If thrust operation conditions are kept the same, the thrust density of $C_{60}$ ions would be greater than Xe ions by a factor of $(720/131)^2$~30 according to Eq. 1. For example, a high thrust mission with a thruster beam power of 10 MW and $I_{sp}$-5,000 with Xe as propellant would need a grid area of 18 $m^2$, which is too large for economically viable construction and lift into space. If a similar ion thruster can be operated with $C_{60}$ fuel, the required grid area decreases to 0.60 $m^2$, which is economically viable for a wide range of space missions. The heavier fullerenes, such as $C_{72}$ or $C_{84}$ would have better size-reduction effects. The chemistry of fullerenes has recently produced extensive classes of fullerene derivatives, fullerene nanotubes, and fullerene nanotube derivatives. Successful usages of these large stable clusters will further increase the thruster density. Therefore, fullerene-family fuels may open new doors for electrostatic propulsion, if they can be successfully used in ion thrusters.

Extensive research and development efforts for fullerene ion thrusters have at best produced engines with undesirably low fuel usage efficiency due to serious propellant deposition and other problems resulting from premature fragmentation before full electrostatic acceleration. Previous state-of-the-art fullerene ion thrusters have used traditional ionization methods including DC and RF discharge plasmas. An example $C_{60}$-based ion thruster system is described in U.S. Pat. No. 5,239,820, entitled "Electric Propulsion Using $C_{60}$ Molecules," issued Aug. 31, 1993, to Leifer et al., the prior usage of such ion thruster structures and operation methods with cathodes and hot filaments in DC or RF discharge chambers has not successful in realizing efficient and practical fullerene ion thrusters. A number of publications similar to the above mentioned $C_{60}$ ion thruster system reported a failure of obtaining sufficiently high efficiency of fullerenes for rendering $C_{60}$ ion thruster practically and economically viable. Other methods include the usage of charge exchange of fullerene with rare gas ions generated in discharge chambers in a modified configuration of Hall thrusters. An example such ion thruster system is described in Hruby, et al., "A High Thrust Density, $C_{60}$ Cluster Ion, Thruster," AFOSR Final Report No. 49620-94-C-0006, September 1996. Such approach also resulted in similar inefficiency of fullerene usage to the above mentioned references.

None of the existing approaches so far resulted in a practical fullerene ion thruster, mainly because their ionization methods for generating fullerene cluster ions induce extensive fragmentation of fullerene clusters resulting in very low efficiency fullerene usage. Therefore, other innovative ion thruster structures and operation methods have been sought for. The present invention solves these problems in existing fullerene ion thrusters with the use of VUV photoionization followed by thermal effusion of fullerene clusters, which has negligible fragmentation during ionization process, thus promises cost effective and practical fullerene ion thrusters for a wide range of space propulsion applications.

SUMMARY OF THE INVENTION

The inventor realized that the fundamental problem in the existing fullerene ion thrusters is in the ionization process of fullerenes and transportation process of the fullerene ions and that the problem can be avoided by using a much gentler ionization method than the ones used in previous works or inventions. The present state-of-the-art fullerene ion thrusters use either electron impact ionization or charge exchange with other rare gases in hot filament environment as used in existing methodologies. Such ionization processes can deposit large internal energy into fullerenes after ionization. The hot filament discharge environment can also rapidly destroy fullerenes. These hot fullerene ions can readily fragment in very short time during acceleration even without collision with rare gas atoms. To make the situation worse, in the traditional fullerene thrusters, transportation of fullerene ions is performed in the mixture of fullerene and rare gas atom vapors at relatively high pressure resulting in further extensive collisional fragmentation.

The salient feature of the present invention lies in the usage of VUV photoionization of molecular beams of fullerene clusters generated by molecular beam sources, including but not limited to Knudsen cells. The photoionization with controlled photon energy can softly ionize fullerenes without depositing extensive internal energy that can fragment fullerene ions. The photoionization cross sections above the ionization potential of fullerene are well investigated. For example, the ionization potential of $C_{60}$ is 7.58 eV, and its photoionization cross section at 10 eV is ~$10^{-16}$ $cm^2$, which is sufficient for efficient and soft photoionization with minimal fragmentation. The reason for this is that during photoionization at photon energy close to the photoionization threshold, the thermal energy, which induces fragmentation, imparted to fullerenes is minimal, and most of photon energy is used for expelling electrons.

The present invention can also minimize fragmentation during evaporation of fullerenes, because the present invention does not require enclosed structures for ionization process, which are required for containing DC or RF energies in prior arts. Since the present invention does not require such heavy enclosed structures for ionization, in principle, the ionization area can be arbitrarily large without increasing the overall weight of the thruster. This advantage allows to lower evaporation temperature of fullerenes sufficiently below the fragmentation threshold temperature resulting in minimal thermal fragmentation. For example, if the photoionization region has a diameter of 30 cm, the unit ionization efficiency can be achieved with fullerene densities in the order of $3\times10^{14}/cm^3$. Such a fullerene number density can be achieved by heating the fullerene solid to 650 C well below the thermal fragmentation temperature of 750 C by molecular beam sources including but not limited to Knudsen cells. With such configuration, almost all fullerenes can be efficiently ionized and accelerated together, thus the collisional fragmentation can be minimized as well. These advantages can not be found in prior art.

The photoionization of fullerenes require intense VUV photon sources with photon energies in excess of 10 eV, well above the photoionization threshold energy, 7.58 eV, of fullerenes. The ideal VUV photons should have high enough photon energy to have reasonably large photoionization cross sections, but low enough photon energy not to fragment fullerenes. The ideal photon energy thus is ~10-20 eV. Such photon energy can be readily achieved by the above mentioned VUV photon source technologies. The new development in VUV photon lamps, including but not limited to, rare gas resonance lamps, rare gas excimer lamps, now provides the required high flux of VUV photons with high efficiency. Furthermore, the scaling up of such VUV photon source seems straightforward. For example, a 10 MW ion thruster for interplanetary mission with 10 kV ($I_{sp}$~5,000 sec) acceleration would require a cluster ion beam of 1 kA with a ion flux of $6.3\times10^{21}$ ions/sec. This would require at least $6.3\times10^{21}$ VUV photons per second. With a photon energy of 10 eV, the required photon source power is 10 kW, which is well within reach of near-future VUV source technologies.

Another advantage of the present invention is that it does not use rare gas for ion transportation in addition to fullerene fuel. Therefore, the structure of the present invention can be considerably simpler and lighter than the exiting fullerene ion thrusters that use conventional discharge plasma technologies. Furthermore, the thrust efficiency of the present invention is significantly high because does not require mixing with rare gas, which reduces the overall thrust efficiency of fullerene-based ion thrusters. Qualitatively, the summary of the advantages of the present invention over the conventional exiting ionization method for fullerene ion thrusters is presented in Table 1.

TABLE 1

Comparison of exiting ionization method and the present invention for fullerene ion thrusters.

| | Existing Ionization Method | Present Invention |
|---|---|---|
| Ionization Physics | Electron Impact Ionization or Charge Exchange | Photoionization |
| Internal Energy Deposition due to Ionization | Much Higher than Fragmentation Threshold | Lower than Fragmentation Threshold |
| Gas Required In Addition to Fullerene Fuel | Yes | No |
| Scaling Up | Difficult | Easy |
| Structure | Complicated | Simple |
| Thrust Efficiency | Low | High |
| Fullerene Fuel Usage | Very Low | High |
| Usage of Fullerene Derivatives | Not Possible | Possible |
| Usage of Fullerene Nanotubes and Their Derivatives | Not Possible | Possible |

Another important aspect of the present invention is in its ability of ionizing with minimal fragmentation of functionalized fullerenes, fullerene nanotubes, and fullerene nanotube derivatives, which have larger mass than fullerenes and can be tailored for mission specificities. Currently, chemists in the world have successfully produced bulk quantities of varieties of functionalized fullerenes (fullerene derivatives), such as $C_{60}$-$F_{48}$, which was recently shown to be evaporable without fragmentation. For example, $C_{60}$-$F_{48}$, has a mass of is 1632. The thrust density of $C_{60}$-$F_{48}$ can be 5 times higher than that of $C_{60}$ alone, and 150 times higher than that of Xe. The potential usage of other heavier functionalized fullerene, fullerene derivatives, fullerene nanotubes, and fullerene nanotube derivatives can further increase the thruster density. Therefore, the successful usage of such fullerene derivatives in the present invention will result in more compact and lighter ion thrusters, thus can greatly expand the usage of ion thrusters for unprecedented space mission applications further beyond ion thrusters using fullerene ions. The ionization with minimal fragmentation of such large fullerene derivatives can be readily achieved by the present invention that uses VUV photoionization.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 1 illustrates schematically a high thruster density ion thruster based on photoionization of fullerene, fullerene derivative, nanotubes, or nanotube derivatives clusters generated by an effusion source with an aperture showing the fundamental principle of the present invention.

FIG. 2 illustrates schematically a detailed view of the effusion source that was depicted in FIG. 1, with a heater that heats the source and heat shields that thermally isolates the source and the heater from the environment.

FIG. 3 illustrates schematically a detailed view of the VUV photon source that was depicted in FIG. 1, with a Vacuum Ultra Violet (VUV) transparent optical window that is heated with a heater for blocking and clearing the deposition of fullerene and fullerene derivative clusters.

FIG. 4 illustrates schematically a detailed view of one of the electrodes (reference numbers 120, 121, and 122) depicted in FIG. 1. The electrodes are heated with imbedded heaters for blocking and clearing the deposition of fullerene and fullerene derivative clusters.

DETAILED DESCRIPTION OF THE DRAWINGS

In the following discussion that addresses a number of embodiments and applications of the present invention, reference is made to the accompanying drawings that form a part hereof, in which is shown by way of illustration specific embodiments in which the invention may be practiced. It is to be understood that other embodiments may be utilized and changes may be made without departing from the scope of the present invention.

The fundamental principle of the present invention lies in the usage of photoionization for ionizing fullerene-family clusters, including but not limited to fullerene clusters, fullerene derivatives, nanotubes, and nanotube derivatives, generated by a molecular beam source, including but not limited to various effusion sources, such as Knudsen cells. In the following descriptions, fullerene clusters can represent fullerene-family clusters or molecules without departing from the scope of the present invention.

FIG. 1 illustrates schematically a fundamental aspect of the present invention, which is a high thrust density ion thruster based on Vacuum Ultra Violet (VUV) photoionization of fullerene clusters. This is a part of the thruster system energized by a power source and controlled by a control unit in a space vehicle. In the thruster system, the thermal effusion source, 101, generates molecular beams by heating solids with resistive, radiative, or inductive heating. Fullerene, 102, is evaporated from a bulk fullerene solid, 103, exiting an aperture, 105, forming a thermal fullerene molecular beam, 104, ionized by a VUV photon beam 111, which is generated by a VUV photon source, 110. The VUV photon source, 110, includes, but is not limited to, resonance line sources and excimer sources that can be energized by electron beams, DC or RF discharge, or their combinations. The photoionized fullerene ions are accelerated first between the first electrode, 120, and the second electrode 121. In some cases, the first electrode can be the frontal surface of the thermal effusion source without departing from the scope of the present invention. The photon flux and the fullerene density are maintained such that the fullerene clusters are fully ionized with minimal multiple ionization and internal energy deposition into the clusters. The photoionized fullerene ions are further accelerated by the third electrode, 122, to a full exit velocity. The fully accelerated fullerene ions form an ion beam, 140, which produces thrust.

The number of electrodes can be varied between 1 and 10 electrodes with voltages between 10 V and 1,000,000 V depending on applications and preferred thruster configuration. The electrodes can be solid plates, apertures or grids, or their combinations. The number of these elements can vary depending on applications and preferred thruster configuration. The number of thermal effusion sources and VUV photon sources can be greater than one without departing from the scope of the present invention. In some situations, the VUV sources can be arranged in a circular fashion with the VUV photon beams directed to the center of the fullerene cluster beams. The VUV sources can be a point, planar, slit or annular source configuration. Other components that are not shown in FIG. 1 are electrostatic focusing and steering elements, and electron sources that neutralize the spacecraft.

FIG. 2 illustrates schematically a detailed view of the effusion source that was depicted in FIG. 1. The effusion source body, 201, is heated to generate vapor of fullerene clusters, 202, from the fullerene cluster solid, 203. The heating of the source body, 201, and the fullerene cluster solid, 203, is performed with a heater assembly, 204. The effusion source, 201, and the heater assembly, 204, are both enclosed by heat shields, 205. The vapor escapes through an aperture, 206, and forms a fullerene cluster jet, 207, for ionization as depicted in FIG. 1.

FIG. 3 illustrates schematically a detailed view of the VUV photon source that was depicted in FIG. 1. The VUV photons generated in the VUV source, 301, pass through a VUV transparent optical window, 302, that is heated with a heater, 303, for blocking and clearing the deposition of fullerene and fullerene derivative clusters on the VUV window, 302. The VUV photons pass through the VUV window, 302, become a VUV beam, 304, that ionizes fullerene and fullerene clusters in the jet. The VUV photon source, 301, includes, but is not limited to, resonance line sources and excimer sources that can be powered by energizing mechanisms, including but not limited to, electron beams or DC or RF discharge.

FIG. 4 illustrates schematically a detailed view of one of many acceleration electrodes, 401, which consists of plural grids, 402, which were depicted in FIG. 1. The plural grids are heated with imbedded heaters, 403, for blocking and clearing the deposition of fullerene and fullerene derivative clusters. As illustrated in FIG. 4, the high current floating power supply provides the necessary power for the heaters, yet the high voltage needed for acceleration of fullerene cluster ions is provided by the high voltage power supply that is connected in series with the floating power supply.

More specifically, the fullerene clusters used in the present invention can be replaced with fullerene derivatives or functionalized fullerenes, including but not limited to fluorinated, hydrogenated, hydroxylated, chlorinated, and brominated fullerenes without departing from the scope of the present invention. The examples of fluorinated fullerene derivatives include but not limited to $C_{60}F_{36}$, $C_{60}F_{48}$, and $C_{60}F_{60}$. The examples of hydroxylated fullerene derivatives include but not limited to $C_{60}(OH)_n$ with n can be 1-60. The examples of hydrogenated fullerene derivatives include but not limited to $C_{60}H_n$ with n can be 1-60. The examples of chlorinated fullerene derivatives include but not limited to $C_{60}Cl_n$ with n can be 1-60. The fullerene derivatives may have attachment of other organic and inorganic molecules without departing from the scope of the present invention.

The fullerene clusters used in the present invention can be replaced with fullerene nanotubes or their functionalized forms, including but not limited to fluorinated, hydrogenated, hydroxylated, chlorinated, and brominated fullerene nanotubes without departing from the scope of the present invention. The fullerene nanotube derivatives may have attachment of other organic and inorganic molecules without departing from the scope of the present invention.

What is claimed is:

1. A thruster comprising:

an effusion source comprising a heater assembly and an aperture, the heater assembly configured to heat a solid comprising fullerene to generate a jet that exits the aperture, the jet comprising vaporized fullerene and/or vaporized fullerene derivative clusters;

a photon source having a discharge chamber containing rare gases, the photon source configured to generate Vacuum Ultraviolet (VUV) photons to photionize the jet thereby creating a stream comprising fullerene ions;

the photon source further comprising a window which is VUV transparent, the photon source having a baffle system configured to block deposition of fullerene and fullerene derivative clusters on the window;

the photon source further comprising a first heater configured to clear deposits of fullerene and fullerene derivative clusters from the window;

an ion acceleration assembly comprising at least a first electrode downstream of the aperture and a second electrode downstream of the first electrode, the first and second electrodes being configured to accelerate the stream;

the ion acceleration assembly further comprising a second heater configured to evaporate deposits of fullerene and fullerene derivatives from the first and second electrodes.

2. A method of providing a thrust with the system of claim 1, the method comprising the steps of;

evaporating the solid with the heater assembly thereby creating the jet;

generating VUV photons with the photon source thereby ionizing the jet and creating the stream;

accelerating the stream with the ion acceleration assembly thereby providing the thrust.

3. The method of claim 2 further comprising the step of, heating the first heater thereby clearing deposits of fullerene and fullerene derivative clusters from the window.

4. The method of claim 2 further comprising the step of, heating the second heater thereby clearing deposits of fullerene and fullerene derivative clusters from the first and second electrodes.

* * * * *